United States Patent [19]

Schlag et al.

[11] Patent Number: 5,047,482
[45] Date of Patent: Sep. 10, 1991

[54] CABLE INSULATION BASED ON ETHYLENE POLYMERS HAVING HIGH RESISTANCE TO THE FORMATION OF WATER TREES

[75] Inventors: Johannes Schlag; Ernst Koehnlein; Peter Bauer, all of Ludwigshafen; Ludwig Koessler, Gruenstadt, all of Fed. Rep. of Germany

[73] Assignee: BASF Aktiengesellschaft, Ludwigshafen, Fed. Rep. of Germany

[21] Appl. No.: 22,216

[22] Filed: Mar. 5, 1987

[30] Foreign Application Priority Data

Mar. 8, 1986 [DE] Fed. Rep. of Germany ....... 3607756

[51] Int. Cl.$^5$ ............... C08L 23/06; C08L 23/08; C08L 23/26; C08L 33/04
[52] U.S. Cl. ................... 525/221; 525/193; 525/194; 524/522; 428/463
[58] Field of Search .......................... 525/221

[56] References Cited

U.S. PATENT DOCUMENTS

| | | | |
|---|---|---|---|
| 3,249,570 | 5/1966 | Potts et al. | 525/221 |
| 3,410,928 | 11/1968 | Baum | 525/221 |
| 4,092,488 | 5/1978 | Hayami et al. | |
| 4,275,180 | 6/1981 | Clarke | 525/173 |
| 4,576,993 | 3/1986 | Tamplin et al. | 525/240 |

FOREIGN PATENT DOCUMENTS 2914014 1/1980 European Pat. Off. .
0157106 10/1985 European Pat. Off. .
8505216 11/1985 PCT Int'l Appl. .

OTHER PUBLICATIONS

Chem. Abstr. 103: 7802.
Chem. Abstr. 99:177160.

*Primary Examiner*—Carman J. Seccuro
*Attorney, Agent, or Firm*—Keil & Weinkauf

[57] ABSTRACT

Cable insulation having high resistance to the formation or growth of water trees and high aging resistance consists of an ethylene polymer (I) and from 0.5 to 20% by weight of an ethylene polymer (II), which is an ethylene/$C_1$–$C_8$-alkyl-$C_3$–$C_6$-alkene carboxylate/$C_3$–$C_6$-alkenecarboxylic acid terpolymer.

3 Claims, No Drawings

CABLE INSULATION BASED ON ETHYLENE POLYMERS HAVING HIGH RESISTANCE TO THE FORMATION OF WATER TREES

The present invention relates to cable insulation which has high resistance to the formation or growth of water trees and good aging resistance and consists of an ethylene polymer (I) and from 0.5 to 20% by weight, based on the ethylene polymer (I), of an ethylene polymer (II) which differs from (I) and conventional additives in the usual amounts.

In insulation of this type consisting of ethylene polymers for electrical cables and lines, water trees may form where high electric field strengths and moisture are present simultaneously. These water trees are considered to weaken the insulation and therefore have to be avoided by suitable additives.

There are a large number of proposals for avoiding or preventing the danger of water trees, these proposals relating to the composition or the addition of agents which retard the formation of water trees.

For example, DE-A-29 48 492 discloses that the polyolefin material intended for cable insulation can be washed with water after granulation and directly before extrusion, in order to remove the small amounts of water-soluble and hygroscopic salts which cause the water trees (cf. also DE-A-29 11 756). The disadvantage of this known method is the relatively complicated procedure, since the granules have to be dried with hot air after the washing process.

It has also been disclosed that water tree inhibitors based on polymeric materials can be added to the polyolefin cable material before the latter is produced. For example, the following are recommended for this purpose in the literature: organopolysiloxanes (cf. U.S. Pat. Nos. 4,492,647 and 4,536,530 and EP-A-109 797), polyethylene glycols (cf. EP-A-57 604), epoxy resins (cf. Chem. Abstr. 96:182235), ethylene/but-1-ene or hex-1-ene copolymers (cf. Chem. Abstr. 101:193825), polypropylene (cf. Chem. Abstr. 102:8329), polybut-1-ene (cf. Chem. Abstr. 98:5097), ethylene/vinyl acetate copolymers (cf. Chem. Abstr. 93:169329), polystyrene and triallyl isocyanurate (cf. DD-A-160 808), ethylene/vinyl acetate or ethylene/alkyl acrylate copolymers grafted with styrene (cf. Chem. Abstr. 103:7802), polyvinyl alcohols (cf. Chem. Abstr. 95:204983), chlorosulfonated polyethylene (cf. Chem. Abstr. 95:204981), nylon (cf. Chem. Abstr. 96:21007), ethylene/ethylacrylate copolymer (cf. Chem. Abstr. 99:177160) or a styrene copolymer eg. styrene/butadiene or styrene/isoprene rubber (cf. Chem. Abstr. 92:7572 and Annual Convention of the Wire Association in Baltimore, U.S.A., reprint of paper, November 1984, ETR No. 3A-1995).

For the known polyolefin cable materials described above and containing added polymeric water tree inhibitors, the effects and the influence on water tree growth differ very greatly, and quantitative information is lacking in most cases. In many cases, the additives have an adverse effect on the homogeneity of the polyolefin cable material and on the aging resistance of the insulating material.

It has also been disclosed that insulating material which is based on polyolefins and copolymers of ethylene with vinyl acetate and has been stabilized to electric stress can be used, and the polyolefin can consist of an ethylene/alkyl acrylate or ethylene/acrylic acid copolymer (cf. U.S. Pat. No. 4,092,488). Such mixtures of ethylene polymers have the disadvantage that either the resistance to the formation and growth of water trees is insufficient or the amount of ester or acid groups has to be chosen so high that the dielectrical losses of the materials are increased to an unacceptable extent.

It is an object of the present invention to avoid the disadvantages stated at the outset and to provide cable insulation based on ethylene polymers which are highly resistant to the formation or growth of water trees as well as having low dielectric losses and high resistance to aging.

We have found that this object is achieved by cable insulation as claimed in the claims.

Electric cable and line insulation consisting of ethylene polymers is well known. It is important that the insulating material has various physical, mechanical and electrical properties which make it suitable for specific applications in the cable industry. In the present case, the particular intention is to improve the resistance to the formation of water trees so that, when the ethylene polymer used is one in which it has been technically impossible to avoid contamination by water-soluble salts, the life of the insulation under voltage stress in the presence of water or moisture is increased . compared with untreated material. Since the admissible conductor temperature is 90° C., good aging resistance, i.e. long-lasting resistance to thermal oxidation and deterioration of the mechanical properties, should also be ensured.

For the purposes of the present invention, ethylene polymers (I) are ethylene homopolymers and copolymers, which differ from ethylene polymer (II). Ethylene polymers of this type are so well known that further description is unnecessary. Particularly suitable ethylene polymers are low density polyethylenes (less than 0.934 g/cm$^3$ according to DIN 53,479), ethylene copolymers with α-olefins, which contain 3 to 8 carbon atoms and are present in an amount of from 5 to 15% by weight, ethylene/vinyl acetate copolymers, preferably those containing from 0.5 to 8% by weight of vinyl acetate as copolymerized units, and ethylene acrylate copolymers, in particular ethylene/ethyl, n-butyl, tert-butyl or ethylhexyl acrylate and similar ethylene copolymers, with the exception of the ethylene terpolymers (II). In the uncrosslinked state, the ethylene polymers preferably have a melt flow index of from 0.2 to 10 g/10 min, measured according to ASTM-D 1238-70 at 190° C. and under a load of 2.16 kg, and densities of from 0.890 to 0.934 g/cm$^3$, measured according to DIN 53,479. Instead of the pure ethylene homopolymers or copolymers, mixtures of different ethylene polymers are also suitable. Ethylene polymers of this type, their properties and their preparation are described in, for example, Ullmanns Encyklopädie der technischen Chemie, 4th edition, volume 19, Verlag Chemie GmbH, D-6940 Weinheim, 1980, page 169-195; Kunststoffe 67 (1977), 118-121, and U.S. Pat. Nos. 3,117,953 and 4,217,431. The ethylene polymers may be crosslinked or uncrosslinked but are preferably from 50 to 90% crosslinked, either by peroxides or high energy radiation.

The ethylene polymers (I) contain from 0.5 to 20, preferably from 2 to 10, in particular from 4 to 8, % by weight of an ethylene polymer (II) which differs from (I), the percentages being based on the weight of the ethylene polymer (I). The ethylene polymer (II) is mixed with the ethylene polymer (I) in a conventional mixer by one of the usual methods.

The mixture of ethylene polymer (I) and ethylene polymer (II) also contains conventional additives in the usual amounts. Conventional additives are, in particular, antioxidants, flameproofing agents, crosslinking assistants, such as triallyl cyanurate, and crosslinking agents, such as organic peroxides, in amounts of from 0.5 to 3.0% by weight, based on the mixture.

According to the invention, the ethylene polymer (II) should be a terpolymer of ethylene having a melt flow index of less than 100 g/10 min, measured at 190° C. and under a load of 2.16 kp according to DIN 53,735, and consist of a) 100 mole parts of copolymerized ethylene, b) from 1 to 5.5 mole parts of a copolymerized $C_1$-$C_8$-alkyl ester of a $C_3$-$C_6$-alkenecarboxylic acid and from 1 to 3.2 mole parts of a copolymerized $C_3$-$C_6$-alkenecarboxylic acid, preferably an ethylene/butyl acrylate/acrylic acid terpolymer. Ethylene terpolymers of this type are known per se and are described, for example, in EP-A1-106-999, EP-A1-157 106 and EP-A1-157 107.

The ethylene terpolymers (II) preferably have a melt flow index of from 1 to 30, in particular from 2 to 20, g/10 min, measured at 190° C. and under 2.16 kp according to DIN 53,735, and a density of from 0.92 to 0.95 g/cm$^3$, measured according to DIN 53,479. The ethylene terpolymers (II) particularly preferably contain from 95 to 98 mole % of ethylene, from 1.5 to 2.5 mole % of butyl acrylate and from 1.3 to 2.3 mole % of acrylic acid, the percentages always summing to 100.

The butyl acrylate present as copolymerized units in the ethylene terpolymer (II) is preferably an n-butyl or tert-butyl ester. The ethylene terpolymers (II) can be prepared by a conventional high pressure polymerization method (cf. Ullmann's Encyklopädie der Technischen Chemie, 4th edition, vol. 19, 1980, pages 169–175, Verlag Chemie GmbH, D-6940 Weinheim, and U.S. Pat. Nos. 3,520,861, 3,201,374 and 3,350,372).

The particular advantage of the invention is that it provides a cable insulation material based on ethylene polymers which both inhibits the formation or growth of water trees and has low dielectric losses and high resistance to aging.

EXAMPLE 1

Low density polyethylene having a melt flow index of 2 g/10 min and a density of 0.918 g/cm$^3$ is treated with 0.3% by weight of 4,4'-thiobis-(6-tert-butyl-3methyl-phenol) as a heat stabilizer and 1.8% by weight of dicumyl peroxide as a crosslinking agent.

This formulation is used to produce 1 mm thick pressed sheets at 130° C., the polyethylene not being crosslinked.

To test for water trees, sodium chloride in the form of small crystals (edge length 10 μm) is finely distributed as a layer in the polyethylene. This is done by dusting the salt onto the uncrosslinked sheet, then placing a second sheet of this type on top and pressing this sandwich to a thickness of 1 mm at 200° C. for 10 minutes. The polyethylene is crosslinked during this procedure.

The samples produced in this manner are stored in water for one week at room temperature. Thereafter, they are subjected to a field strength of 2.5 kV/mm at 100% atmospheric humidity.

After having been subjected to electric stress, the number, length and structure of the resulting water trees in the individual samples are determined under an optical microscope. The number of water trees is determined in the beam path parallel to the direction of the electric field to which the sample was exposed.

The number of water trees formed is related to the number of NaCl crystals and stated as an amount in % by weight in the table. The length of the water trees is determined in about 0.5 mm thick sections through the sample, the viewing direction being at right angles to the direction of the electric field.

The dielectric losses (tan δ) are determined on 1 mm thick pressed sheets at 23° C. and 80° C. and a frequency of 60 Hz.

EXAMPLE 2

Polyethylene as in Example 1 is mixed with an ethylene/n-butyl acrylate copolymer containing 19% by weight of n-butyl acrylate (nBA) so that the mixture contains 2% by weight of nBA. This mixture is treated with a heat stabilizer and a crosslinking agent, as described in Example 1.

Testing is carried out as in Example 1, and the result is shown in the Table.

EXAMPLE 3

Polyethylene as in Example 1 is mixed with an ethylene/acrylic acid copolymer containing 20% by weight of free acrylic acid so that the mixture contains 2% by weight of acrylic acid. The heat stabilizer and crosslinking agent are added as described in Examples 1 and 2.

Testing is carried out as in Example 1, and the result is shown in the Table.

EXAMPLE 4

Polyethylene as in Example 1 is mixed with a terpolymer consisting of 88% by weight of ethylene, 8% by weight of n-butyl acrylate and 4% by weight of acrylic acid (AA) so that the mixture contains 1.3% by weight of nBA and 0.7% by weight of AA. The heat stabilizer and crosslinking agent are added, as described in Examples 1 to 3.

Testing is carried out as in Example 1, and the result is shown in the Table.

EXAMPLE 5

Polyethylene as in Example 1 is mixed with a copolymer of 81% by weight of ethylene and 19% by weight of n-butyl acrylate so that the mixture contains 10% by weight of nBA. The heat stabilizer and crosslinking agent are added, as described in Examples 1 to 4.

Testing is carried out as in Example 1, and the result is shown in the table.

TABLE

| Example | Mixture, % by weight | | | Water tree | | | | Dielectric losses tan at 60 Hz, 23° C. |
|---|---|---|---|---|---|---|---|---|
| | | | | 7 days | | 80 days | | |
| | LDPE | nBA | AA | Amount % | Length μm | Amount % | Length μm | |
| 1 | 100 | — | — | 95 | 400 | 95 | 1000 | $1 \times 10^{-4}$ |
| 2 | 98 | 2 | — | 50 | 400 | 95 | 500 | $3 \times 10^{-4}$ |
| 3 | 98 | — | 2 | 95 | 400 | 95 | 900 | $5 \times 10^{-4}$ |

TABLE-continued

| Example | Mixture, % by weight | | | Water tree | | | | Dielectric losses tan at 60 Hz, 23° C. |
| --- | --- | --- | --- | --- | --- | --- | --- | --- |
| | | | | 7 days | | 80 days | | |
| | LDPE | nBA | AA | Amount % | Length μm | Amount % | Length μm | |
| 4 | 98 | 1.3 | 0.7 | 1 | 400 | 10 | 500 | $3 \times 10^{-4}$ |
| 5 | 90 | 10 | — | 0 | — | 1 | 400 | $1 \times 10^{-3}$ |

LDPE = Low Density Polyethylene
nBA = n-butylacrylate
AA = Acrylic Acid

The table shows that the combination of the n-butyl ester and free acrylic acid has a synergistic effect with regard to protection from the formation of water trees.

We claim:

1. A cable insulation having high resistance to the formation or growth of water trees and high aging resistance and consisting of a low density polyethylene (I) and from 2 to 10% by weight, based on the low density polyethylene, of an ethylene polymer (II) which differs from (I) and conventional additives in the usual amounts, wherein the ethylene polymer (II) is a terpolymer having a melt flow index of from 1.0 to 30 g/10 min, measured at 190° C. and under a load of 2.16 kp according to DIN 53,735, and consisting of
   (a) 100 mole parts of copolymerized ethylene;
   (b) 1 to 5.5 mole parts of a copolymerized $C_1$–$C_8$-alkyl ester of a $C_3$–$C_6$-alkenecarboxylic acid; and
   (c) 1 to 3.2 mole parts of a copolymerized $C_3$–$C_6$-alkenecarboxylic acid.

2. A cable insulation as claimed in claim 1, wherein the ethylene polymer (II) is an ethylene/butyl acrylate/acrylic acid terpolymer.

3. A cable insulation as claimed in claim 1, wherein the ethylene polymer (II) has a density of from 0.92 to 0.95 g/cm$^3$, measured according to DIN 53,479.